(12) United States Patent
Chiang et al.

(10) Patent No.: US 8,755,621 B2
(45) Date of Patent: Jun. 17, 2014

(54) DATA COMPRESSION METHOD AND DATA COMPRESSION SYSTEM

(75) Inventors: Cheng-Ta Chiang, Banqiao (TW); Wei-Cheng Chang Chien, Kaohsiung (TW); Wei-Hao Yuan, Tainan (TW); Chieh-Yuan Hsu, Kaohsiung (TW); Te-Wei Lee, Pingzhen (TW); Tzu-Yun Kuo, Longtan Township, Taoyuan County (TW); Wei-Cheng Chang, Taoyuan (TW)

(73) Assignee: Alpha Imaging Technology Corp., Hsinchu County (TW)

( * ) Notice: Subject to any disclaimer, the term of this patent is extended or adjusted under 35 U.S.C. 154(b) by 286 days.

(21) Appl. No.: 12/938,676

(22) Filed: Nov. 3, 2010

(65) Prior Publication Data
US 2011/0116725 A1    May 19, 2011

(30) Foreign Application Priority Data
Nov. 17, 2009  (TW) ............................... 98139054 A

(51) Int. Cl.
*G06K 9/00*  (2006.01)
*G06K 9/36*  (2006.01)
*G06K 9/46*  (2006.01)

(52) U.S. Cl.
USPC ............ 382/251; 382/239; 382/244; 382/248

(58) Field of Classification Search
USPC .................................. 382/251, 239, 244, 248
See application file for complete search history.

(56) References Cited

U.S. PATENT DOCUMENTS

| | | | | |
|---|---|---|---|---|
| 5,260,808 A | * | 11/1993 | Fujii | 382/166 |
| 6,697,529 B2 | * | 2/2004 | Kuniba | 382/239 |
| 6,915,014 B1 | * | 7/2005 | Honma et al. | 382/239 |
| 2008/0044156 A1 | * | 2/2008 | Sugahara et al. | 386/52 |

* cited by examiner

*Primary Examiner* — Matthew Bella
*Assistant Examiner* — Weiwen Yang
(74) *Attorney, Agent, or Firm* — Muncy, Geissler, Olds & Lowe, P.C.

(57) ABSTRACT

A data compression system and a data compression method using the same are provided. The data compression method includes acquiring original data from a memory and performs image processing and quantization on the original data to transform the original data into a quantization matrix. The data compression method then transforms the quantization matrix into a digital sequence based on a coding table and compares the data volume of the digital sequence and a target volume to generate a volume difference. The data compression method transforms the digital sequence into an inverse quantization matrix based on the volume difference and then transforms the inverse quantization matrix into a modified digital sequence based on the volume difference. The data compression method repeats the processes until the data volume of the digital sequence is substantially equal to a target volume or within an acceptable range of the target volume.

15 Claims, 8 Drawing Sheets

DATA COMPRESSION METHOD AND DATA COMPRESSION SYSTEM

BACKGROUND OF THE INVENTION

1. Field of the Invention

This invention relates to a data compression method and a data compression system using the same; specifically to an image information compression method and an image information compression system using the same.

2. Description of the Prior Art

After images obtained from digital cameras are transformed into digital format to be stored in digital memory, digital cameras almost completely replace the conventional photo cameras. Furthermore, currently most mobile phones are fitted with digital cameras so that users can capture images and store the images in digital format in the memory of the mobile phones. In order to utilize the memory more efficiently, digital cameras and other electronic devices equipped with digital cameras normally have a digital image compression system to compress the digital images to reduce its data volume without reducing its image quality. In addition, memories of the electronic devices have different memory spaces and therefore a data compression rate is set in accordance with the memory space. Each digital image has an original data volume and the digital image compression system controls the data volume of the digital image based on its original data volume and the data compression rate. The above-mentioned data compression rate is the ratio between the original data volume and data volume of the compressed digital image. For instance, the digital image compression system with data compression rate of 5 will compress a 10M digital image to a 2M data image.

FIG. 1 is a block diagram of a conventional digital image compression system 10. As FIG. 1 shows, the conventional digital image compression system 10 has an image processing module 20, a space transformation module 30, a quantization module 40, a sequence transformation module 50, and a memory 60, wherein the memory 60 includes original image information 70. Furthermore, as FIG. 1 shows, the image processing module 20, the space transformation module 30, the quantization module 40, the sequence transformation module 50 and the memory 60 form a loop; in other words, the image processing module 20, the space transformation module 30, the quantization module 40, the sequence transformation module 50 will produce a compressed version of the original image information 70 and the original image information 70 is stored in the memory 60. The image processing module 20, the space transformation module 30, the quantization module 40, and the sequence transformation module 50 are connected in series. Furthermore, the original image information 70 has a plurality of pixel data and each pixel data represents the ratio between three primary colors (red, blue, and green) in one pixel.

In the conventional digital image compression system 10, the image processing module 20 reads the original image information 70 from the memory 60 and then processes the original image information 70. The color ratio among red, blue, and green in the original image information 70 is transformed into an 8×8 matrix, wherein each coefficient of the matrix represents the chromaticity of the image. The space transformation module 30 then transforms the original image information 70 according to the discrete cosine transformation theory. In other words, the space transformation module 30 transforms the original image information 70 from a space domain to a frequency domain. The quantization module 40 illustrated in FIG. 1 includes a quantization table, wherein the quantization table is a matrix having the same dimension as the original image information 70. Each coefficient of the quantization table corresponds to one coefficient of the original image information 70 so that the quantization module 40 can quantize the original image information 70. The sequence transformation module 50 then codes the original image information 70 to transform the original image information into a data sequence to be stored in the memory 60.

The conventional digital image compression system 10 includes a compression rate for the system to acquire a target data volume based on the compression rate and the data volume of the original image information 70. Furthermore, before storing the data sequence into the memory 60, the sequence transformation module 50 will compare the data volume of the data sequence with the target data volume. If the data volume of the data sequence does not reach the target data volume, the sequence transformation module 50 will discard the original data sequence and controls the quantization module 40 to adjust the quantization table. The image processing module 20, the space transformation module 30, the quantization module 40, and the sequence transformation module 50 will then repeat the processes mentioned above until the data volume of the data sequence reaches the target data volume.

However, before the data volume of the data sequence reaches the target data volume, the memory 60 will need a large storage space to store the original image information 70. Furthermore, the processes require repeatedly reading data from the memory 60 and thus will continuously occupy a portion of bandwidth of the memory 60. In addition, before the data sequence reaches the target data volume, the processes of repeatedly reading and transforming data will inevitably increase the power usage of the conventional digital image compression system 10.

SUMMARY OF THE INVENTION

It is an object of the present invention to provide a data compression method and a data compression system using the same for saving memory storage space and memory bandwidth.

It is another object of the present invention to provide a data compression method and a data compression system with reduced power usage.

The data compression method of the present invention includes acquiring original data from a memory, wherein the original data includes YUV format data and other types of raw image information. The data compression method includes processing the original data to generate a transformation matrix, wherein the transformation matrix includes an 8×8 matrix, but is not limited thereto, and the transformation matrix can include matrixes of other dimensions. The data compression method includes transforming the transformation matrix into a quantization matrix based on a quantization table and then transforms the quantization matrix into a digital sequence based on a coding table. The data compression method then compares the data volume of the digital sequence and a target volume to generate a volume difference.

In one embodiment of the data compression method of the present invention, if the volume difference is greater than a predetermined difference value, the data compression method will perform an inverse quantization on the digital sequence and transforms the digital sequence into an inverse quantization matrix. In the meanwhile, the data compression method modifies the coefficients of quantization table based on the volume difference, wherein the modified quantization table is used to quantize the inverse quantization matrix. Afterward, the data compression method transforms the newly quantized matrix into a modified digital sequence based on the coding table and repeats the above-mentioned processes until the volume difference is smaller than the predetermined difference.

DETAILED DESCRIPTION OF THE PREFERRED EMBODIMENT

The present invention provides a data compression method and a data compression system using the same, specifically an image information compression method and an image information compression system. The data compression method of the present invention can be used in an image acquisition system to process and compress original image information generated by the image acquisition system. In this way, the data compression method preserves the quality of the original image information while reducing the data volume of the original image information to be stored in memory or displayed. In different embodiments, the present invention can be used in mobile communication devices or other electronic devices with image acquisition capability or image display capability.

Figure 1:
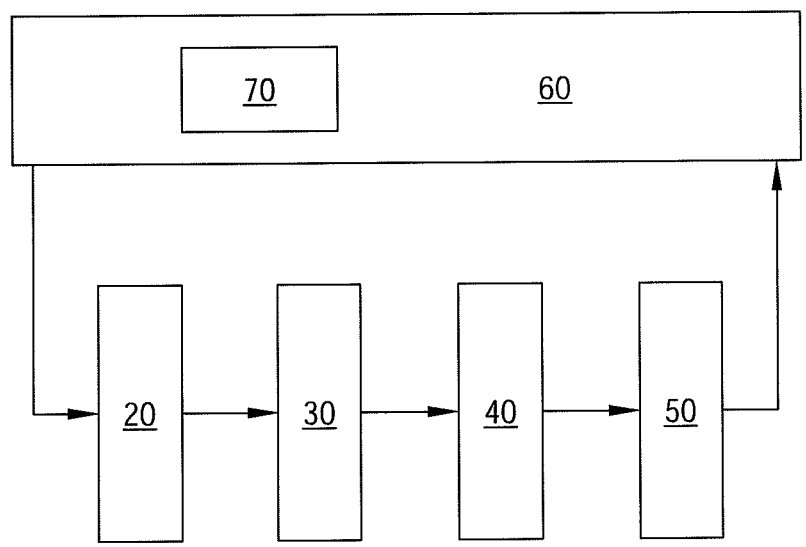
FIG. 1 is a block diagram of a conventional digital image compression system.
Figure 2A:
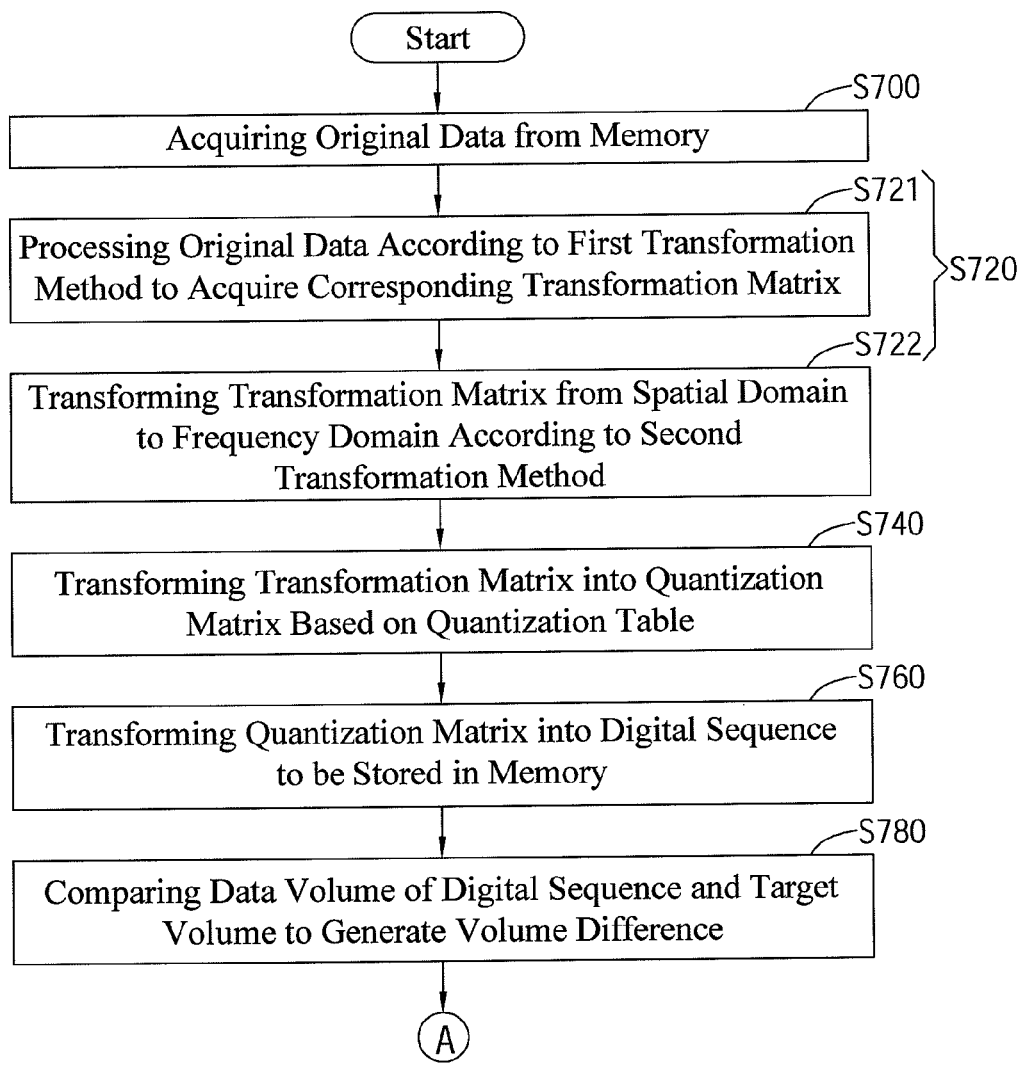
FIG. 2A and FIG. 2B are flow charts of the data compression method of the present invention.
Figure 2B:
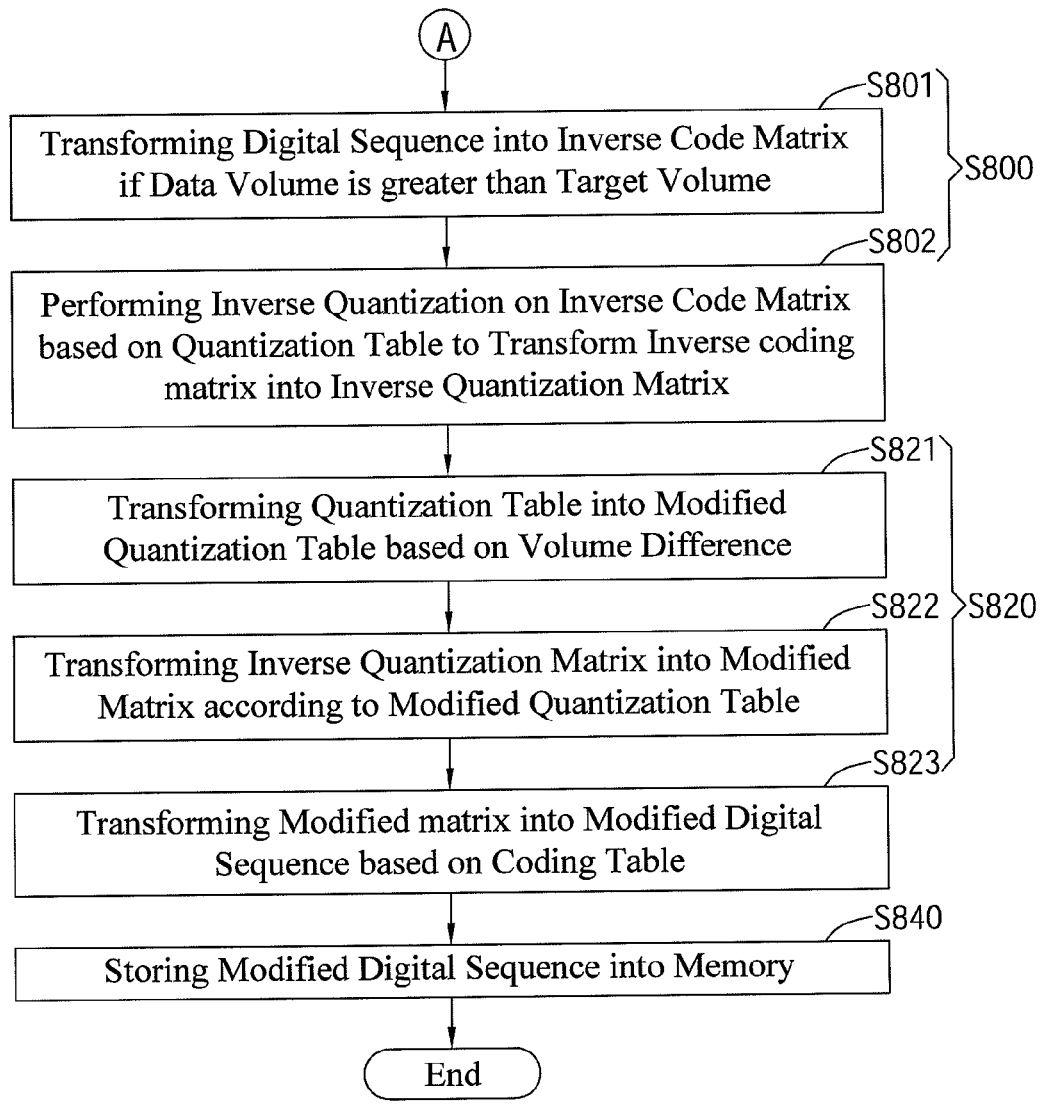
Figure 5:
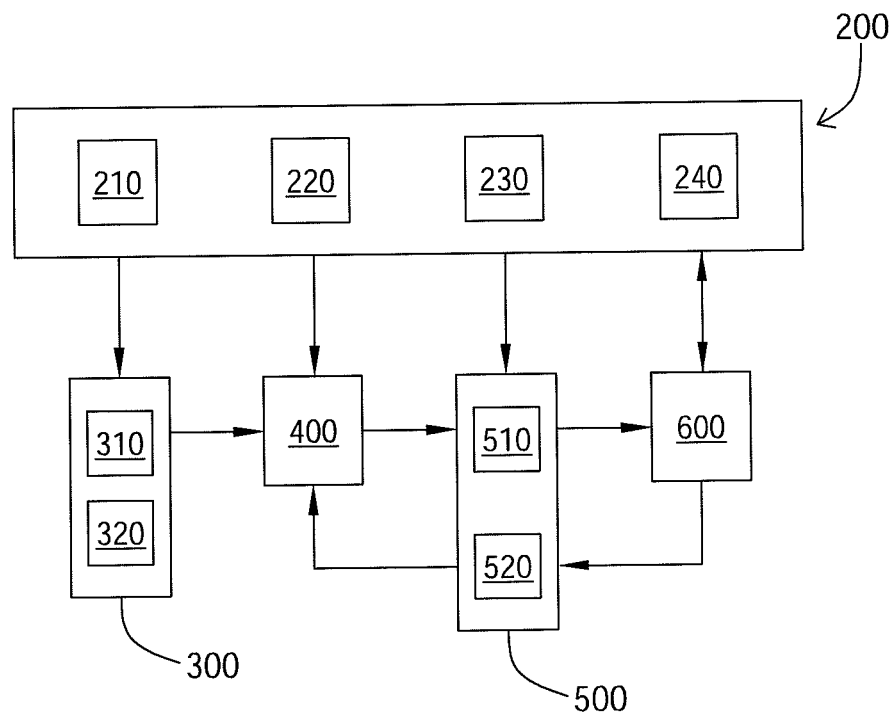
FIG. 5 is a block diagram of the data compression system of the present invention.

FIG. 2A and FIG. 2B are flow charts of the data compression method of the present invention, wherein the electronic elements used in the data compression method will be disclosed in FIG. 5. In other words, the connection between electronic elements in the present embodiment will be disclosed in FIG. 5. As FIG. 2A shows, the data compression method includes step S700 of acquiring original data from a memory. The memory of the present embodiment includes a memory card or other electronic storage devices for storing image files or other electronic data. Furthermore, the original data of the present embodiment is the JPEG (Joint Photographic Experts Group) data but is not limited thereto; in different embodiments, the original data includes MPEG-1, MPEG-2, MPEG-4 and other types of electronic data. The data compression method further includes step S720 of processing the original data to generate a transformation matrix, wherein the original data from the memory will be sent to a signal processing module for digital image processing to generate the transformation matrix corresponding to the original data. Furthermore, the signal processing module includes an image processing module and a space transformation module each having different function.

As FIG. 2A shows, the step S720 further includes step S721 of processing the original data according to a first transformation method to acquire the corresponding transformation matrix. In the present embodiment, the original data includes a plurality of sample data, wherein each of the sample data includes color information of red, green, and blue for each unit area of the image intended to be displayed. The step S721 transforms the sample data into image information such as luminance, chrominance or chroma using a formula, wherein the luminance, chrominance, and chroma each represents a portion of the image information in an image block. Step S721 of the present embodiment transforms each sample data or corresponding color data into an YUV color space, but is not limited thereto; in different embodiments, step S721 can transform the color data into an Y'UV color space, an YCbCr color space or an YPbPr color space. Step S721 further includes transforming luminance, chrominance or chroma information of each of the sample data into an 8×8 transformation matrix. Furthermore, the transformation matrix is an 8×8 matrix, but is not limited thereto; in different embodiments, step S721 selectively transforms the luminance, chrominance or chroma information of each of the sample data into a 16×8 or a 16×16 matrix according to a resolution requirement, format of the original data or other requirements.

In the embodiment illustrated in FIG. 2A, step S720 further includes step S722 of transforming the transformation matrix from the spatial domain to a frequency domain according to a second transformation method. Before step S722 is executed, each coefficient of the transformation matrix represents one of the luminance, chrominance or chroma information of the image at a certain position in a three-dimensional space. The second transformation method transforms each coefficient of the transformation matrix into a weight of one spectrum in the frequency domain. In other words, coefficients of the transformation matrix are located at either the space domain or the frequency domain at different stages of the data compression method. In addition, the second transformation method of the present embodiment is the discrete cosine transform (DCT), but is not limited thereto; in different embodiments, the second transformation also includes the wavelet transformation, the Fourier transformation or other methods used to transform signals from the space domain into the frequency domain.

In the embodiment illustrated in FIG. 2A, the data compression method includes step S740 of transforming the transformation matrix into a quantization matrix based on a quantization table. In the present embodiment, each coefficient of the transformation matrix transformed into the frequency domain represents the frequency of change in luminance, chrominance or chroma of a portion of the image. The human eye is not sensitive to change in the image's luminance and thus data in, the coefficients representing luminance can be reduced without compromising the image quality through quantization to compress the image information. The quantization in step S740 aims at reducing data contained in the coefficients of the transformation matrix based on the fact that the human eyes are not sensitive to changes in luminance. The quantization in step S740 will divide the coefficients of the transformation matrix by a constant and then round the coefficients off to the nearest integer. In the present embodiment, the coefficients with high weight will be adjusted to 0 during step S740. Thus the quantization of the present embodiment not only reduces the data contained in the transformation matrix but also saves the memory space required for storing the data.

As FIG. 2A shows, the data compression method includes step S760 of transforming the quantization matrix into a digital sequence to be stored in the memory. In the present embodiment, the digital sequence and the original data have the same format. However, the digital sequence obtained after quantization contains less data and therefore requires less memory space to store the digital sequence.

Furthermore, the transformation matrix contains coefficients representing different attributes and thus step S760 includes using different coding method to transformation different portions of the transformation matrix into digital sequence. The first coefficient of the quantization matrix is a direct current coefficient. In other words, the first coefficient of the quantization matrix represents the portion of the image where the luminance, chrominance or chroma is not changed. In the present embodiment, the step S760 uses both a predictive coding method and an entropy coding method to code the direct current coefficient, but is not limited thereto; in different embodiments, step S760 can use both the predictive coding method and a Huffman coding method or an arithmetic coding method to code the direct current coefficient. In addition, in the present embodiment, other coefficients of the quantization matrix are coded using a run length code method and the entropy coding method, but are not limited thereto; in different embodiments, coefficients of the quantization matrix other than the direct current coefficient can be coded using the run length coding method and the Huffman coding method or the arithmetic coding method.

In the embodiment illustrated in FIG. 2A, the data compression method includes step S780 of comparing the data volume of the digital sequence and a target volume to generate a volume difference, wherein the target volume is the desired data size of the digital sequence. As FIG. 2A shows, step S780 includes setting a target volume, wherein the target volume is a constant value. In other words, the data compression method of the present embodiment aims at compressing the transformation matrixes to the same data volume, but is not limited thereto; in different embodiments, the data compression method can set the target volume according to the initial data volume of the transformation matrix or other conditions. In other words, the transformation matrix can be assigned with different target volume.

As FIG. 2B shows, the data compression method include step S800 of transforming the digital sequence into an inverse quantization. Step S800 includes transforming the digital sequence not yet reaching the target volume back to a matrix for further data compression processing. The digital sequence will be transformed into an inverse matrix based on the difference between the data volume of the digital sequence and the target volume. Thus data compression method needs not repeat step S700 and step S720 and in this way saves the bandwidth and power required to read the original data from the memory and further improves the efficiency in data processing.

Step S800 further includes transforming the digital sequence into an inverse code matrix if the data volume is greater than the target volume. In the present embodiment, step S800 includes step S801 of transforming the digital sequence into an inverse code matrix if the data volume is greater than the target volume, wherein the inverse code matrix and the quantization matrix in step S760 have the same number of coefficients. Furthermore, step S800 further includes step S802 of performing an inverse quantization on the inverse code matrix based on the quantization table to transform the inverse coding matrix into an inverse quantization matrix which is then quantized into a digital sequence with data volume close to the target volume. In the present embodiment, step S802 aims at transforming the inverse quantization matrix back to the transformation matrix before performing step S740. In other words, step S802 aims at transforming the coefficients in the inverse quantization matrix back to those before step S740. As FIG. 2B shows, step S800 allows the data compression method to perform step S720 only once and therefore saves power and other resources to read data from memory or store data into the memory.

Furthermore, the data compression method further includes step S820 of transforming the inverse quantization matrix into a modified digital sequence. In the present embodiment, step S820 aims at performing quantization on the inverse quantization matrix based on a new quantization table so that the quantized inverse quantization matrix can be transformed into the modified digital sequence whose data volume reaches the target volume. As FIG. 2B shows, step S820 includes step S821 of transforming the quantization table into a modified quantization table based on the volume difference and step S822 of transforming the inverse quantization matrix into a modified matrix according to the modified quantization table, wherein the quantization table and the modified quantization table are both matrixes with the same dimension. The above-mentioned volume difference is the difference between the data volume of digital sequence and the target volume.

Furthermore, step S820 illustrated in FIG. 2B further includes step S823 of transforming the modified matrix into a modified digital sequence. Afterward, step S823 includes determining the data volume of the modified digital sequence and compares the data volume with the target volume again to obtain a modified volume difference. The above-mentioned modified volume difference is compared with the target volume, if the modified volume is greater than the target volume, step S823 will send the modified digital sequence back to step S800 for further processing until the data volume of the modified digital sequence substantially reaches the target volume.

As FIG. 2B shows, the data compression method further includes step S840 of storing the modified digital sequence into the memory, wherein the step S840 is only executed if the data volume of modified digital sequence reaches the target volume. In this way, the data compression method of the present invention only needs to read data from the memory once and store data into the memory once. Thus the data compression method of the present invention saves the bandwidth and power used by reducing the number of times of reading and writing data into memory.

Figure 3A:
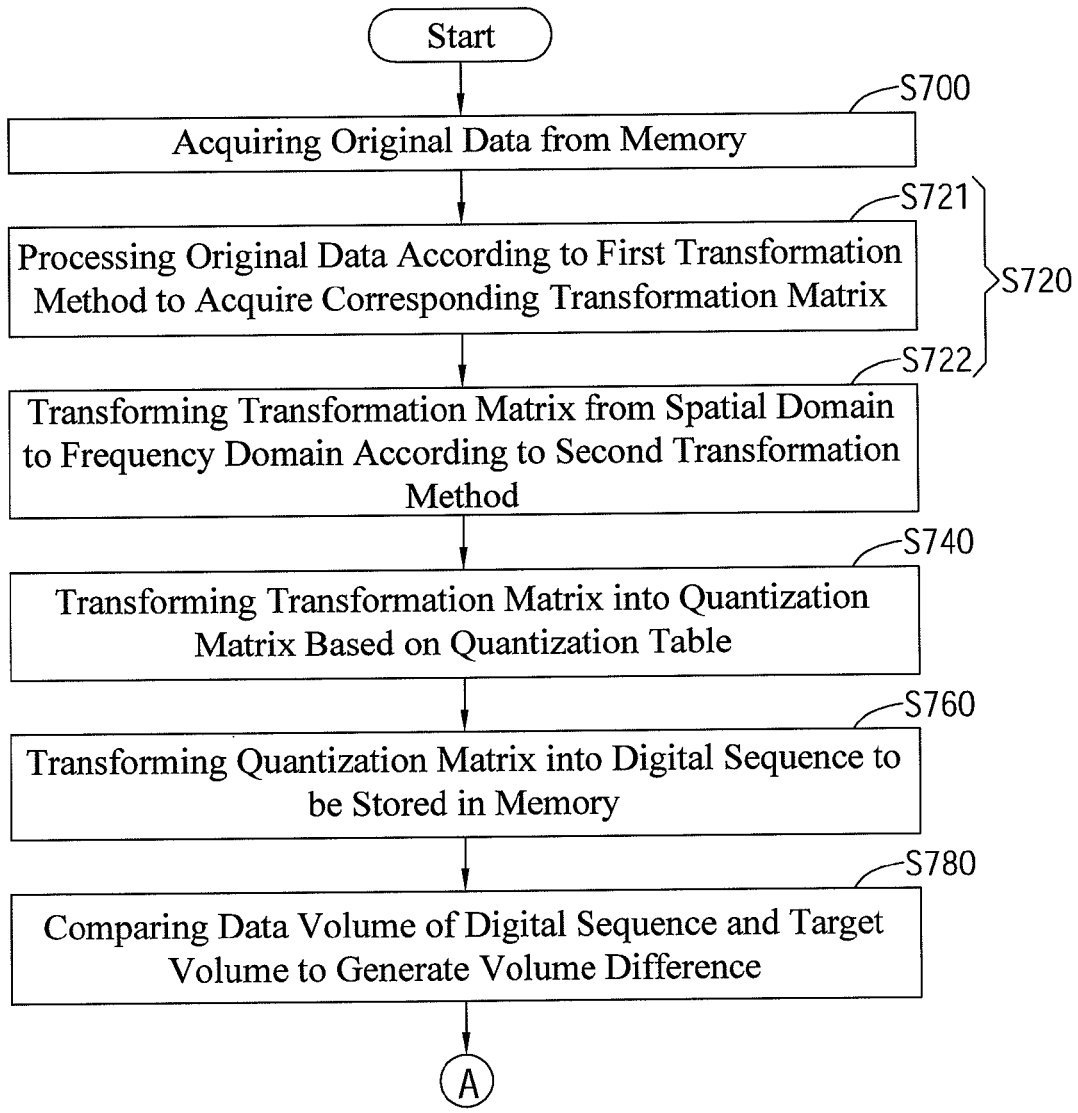
FIG. 3A and FIG. 3B illustrate a variation embodiment of the data compression method illustrated in FIG. 2A and FIG. 2B.
Figure 3B:
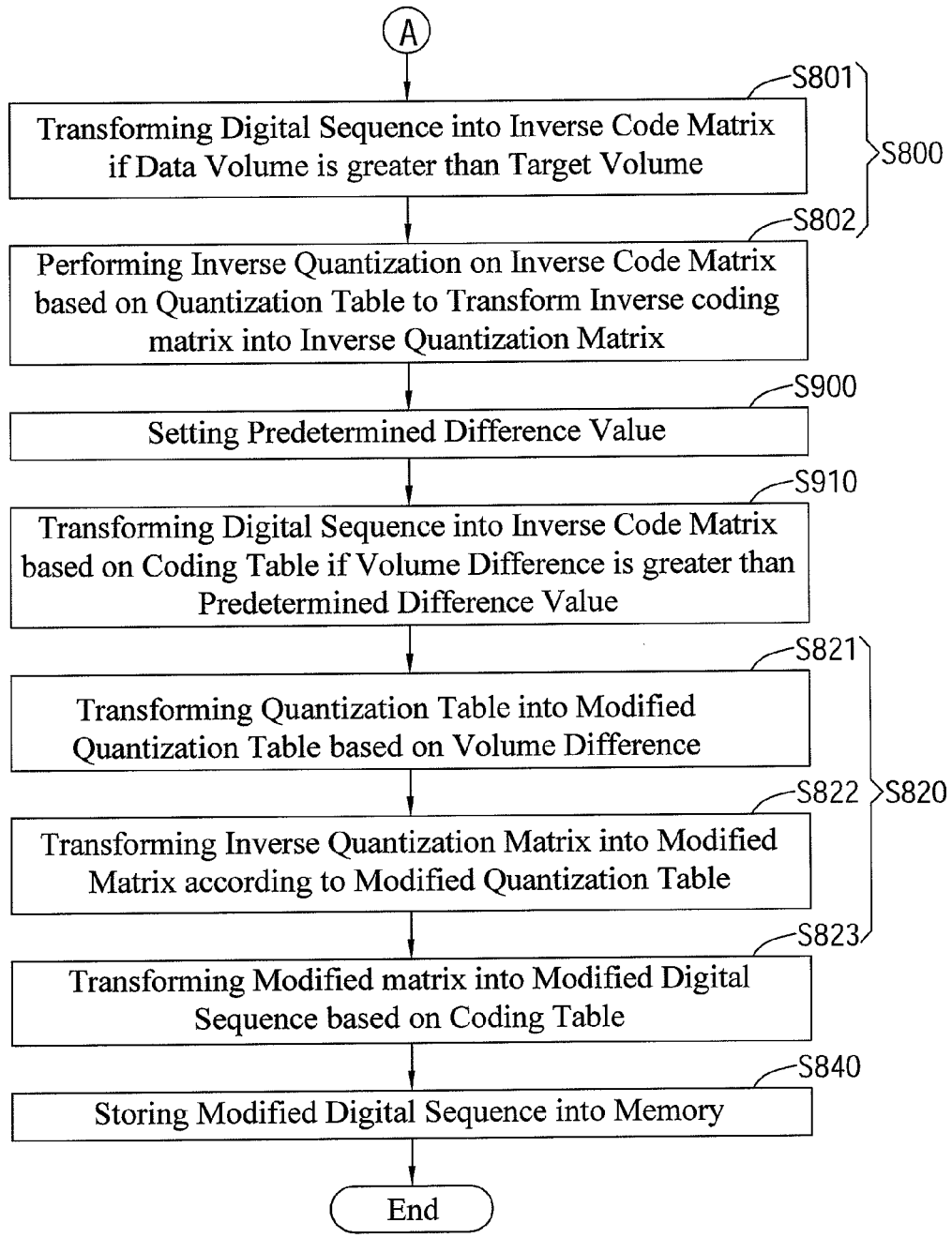

FIG. 3A and FIG. 3B together illustrate a variation embodiment of the data compression method illustrated in FIG. 2A and FIG. 2B. The data compression method in FIG. 3A is substantially identical to that illustrated in FIG. 2A. As FIG. 3B shows, the data compression method further includes step S900 of setting a predetermined difference value. Compressing the original data to the exactly the target volume will require excess amount of time and resources which affect the calculation efficiency of the data compression method. Therefore, in this embodiment, step S900 sets the predetermined difference value to define the acceptable difference between the data volume of the modified digital sequence and the target volume. The data compression method further includes step S910 of transforming the digital sequence into an inverse code matrix based on the coding table if the volume difference is greater than the predetermined difference value. In the present embodiment, the data compression method uses the predetermined difference value to determine if the modified digital sequence is compressed to the desired size. In this way, the data volume of the modified digital sequence of the present embodiment needs not to be compressed to the target volume and not to waste resources due to excessively repeating data compression method and associated calculation. In other words, the data compression of the present embodiment uses step S900 and S910 to reduce the waste of resources on data compression by reducing the number of times in calculations.

Figure 4A:
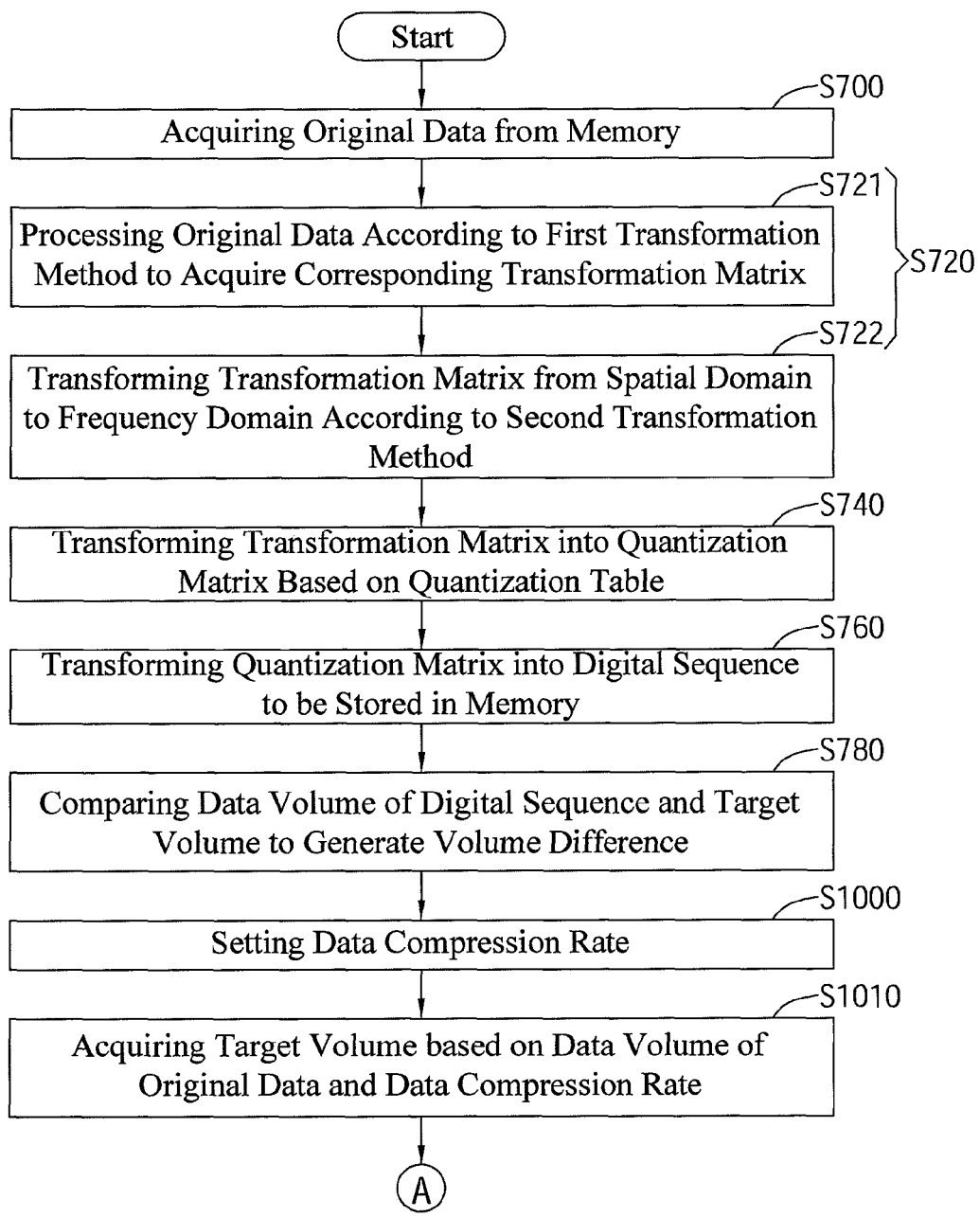
FIG. 4A and FIG. 4B illustrate another variation embodiment of the data compression method illustrated in FIG. 2A and FIG. 2B.
Figure 4B:
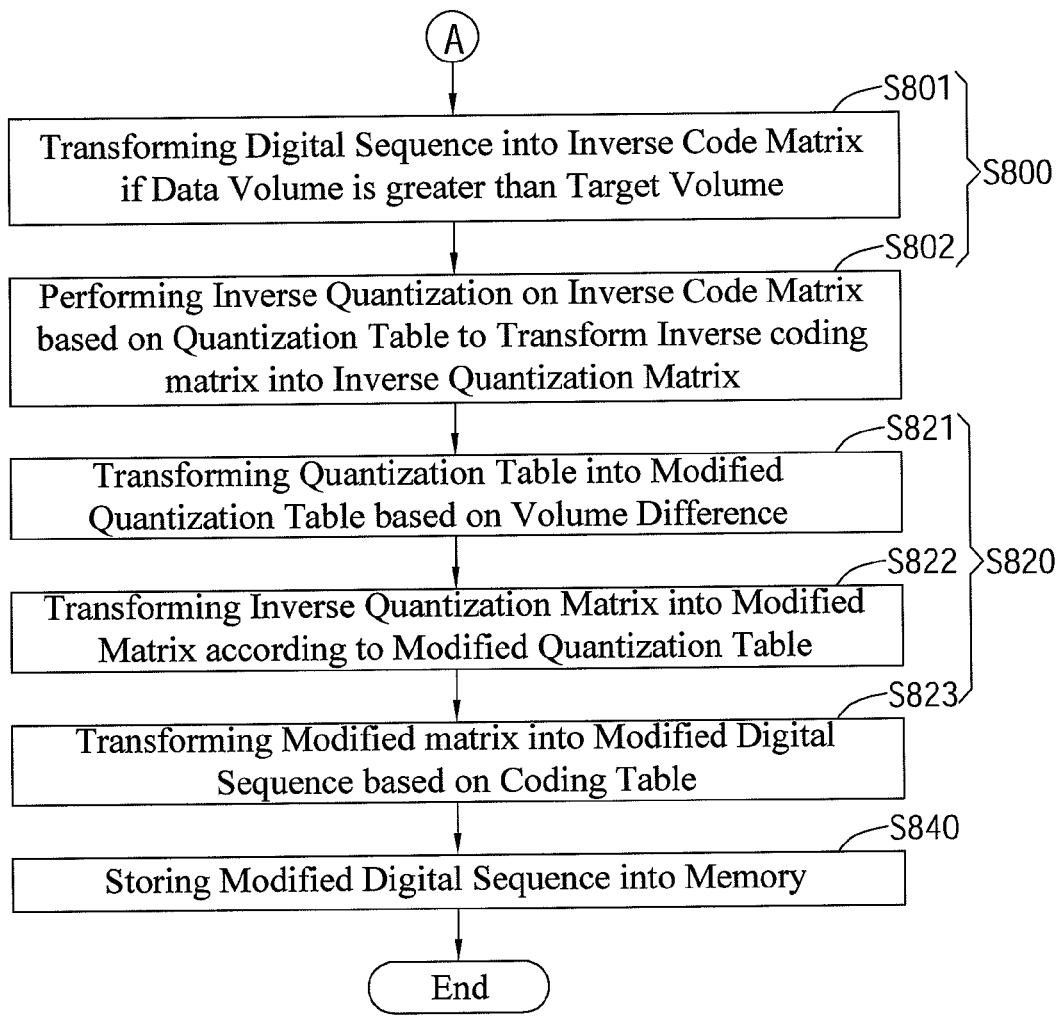

The data compression method illustrated in FIG. 4A and FIG. 4B is a variation of the data compression method illustrated in FIG. 2A and FIG. 2B. In the present embodiment, the data compression method includes step S1000 of setting a data compression rate and step S1010 of acquiring the target volume based on the data volume of original data and the data compression rate. The above-mentioned data compression rate is a percentage used to define the relationship of the data volume before and after compression. For instance, for a data compression rate of 10%, a 10 megabytes file will be compressed to a 1 megabytes file. In this way, the target volume generated by step S1010 will be affected by the data volume of the original data. Thus, the data volume of the modified digital sequence generated by the data compression method will be affected by the data volume of the original data. It can be seen that by executing step S1000 and S1010, the data compression method of the present embodiment is able to maintain the data volume of the modified digital sequence to the data volume of the original data and modified digital sequence within a certain ratio.

FIG. 5 is a block diagram of the data compression system 100 of the present invention. As FIG. 5 shows, the data compression system 100 includes a memory 200, a signal processing module 300, a quantization module 400, a sequence transformation module 500 and a comparison module 600. As FIG. 5 shows, the memory 200 includes original data 210, a quantization table 220, a coding table 230 and a target volume 240. Furthermore, the memory 200 is connected to the signal processing module 300, the quantization module 400, the sequence transformation module 500 and the comparison module 600 so that those modules can read and modify the original data 210, the quantization table 220, the coding table 230 and the target volume 240. The signal processing module 300 is used to generate a transformation matrix based on the original data.

As FIG. 5 shows, the signal processing module 300 includes an image processing module 310 and a space transformation module 320. The image processing module 310 is used to read the original data 210 from the memory 200 and effectively transforms the original data 210 into a transformation matrix, wherein the transformation matrix of the present embodiment is an 8×8 matrix, but is not limited thereto. The original data 210 includes a plurality of sample data, wherein the image processing module 310 transforms each sample data into information such as luminance, chrominance and chroma. Afterward, the image processing module 310 transforms the information including luminance, chrominance and chroma of each sample data into an 8×8 transformation matrix, wherein data in the transformation matrix is located in a space domain.

In the embodiment illustrated in FIG. 5, the space transformation module 320 is used to transform the transformation matrix from the space domain to a frequency domain. Each coefficient in the transformation matrix represents the luminance, the chrominance and chroma in a certain position of the space domain. The space transformation module 320 of the present embodiment uses discrete cosine transform method to transform each coefficient of the transformation matrix into a weight in the frequency domain, but is not limited thereto; in different embodiments, the space transformation module 320 can use the wavelet transform method, the Fourier transform method or other methods that can be used to transform the signals from the space domain to the frequency domain.

In the embodiment illustrated in FIG. 5, the quantization module 400 uses the quantization table 220 in the memory 200 to transform the transformation matrix from the space transformation module 320 into a quantization matrix. The human eyes are not sensitive to brightness variation in images and therefore the quantization module 400 aims at reducing the data volume in the coefficient of the transformation matrix with greater weight. The quantization module 400 divides the coefficients in the transformation matrix by a constant and then round off the coefficient to the closest integer. In the present embodiment, most of the coefficients with greater weight will be adjusted to 0. Thus it can be seen that the quantization reduces the data volume in the transformation matrix and also saves the memory space required to store data.

As FIG. 5 shows, the sequence transformation module 500 includes a coding module 510 and a decoding module 520, wherein the coding module 510 uses the coding table 230 to transform the quantization matrix into a digital sequence. Furthermore, the digital sequence of the present embodiment and the original data 210 have the same data format and can both be stored in the memory 200. In the present embodiment, the quantization matrix has a direct current coefficient and other types of coefficients, and therefore the sequence transformation module 500 can use different coding methods to generate a new coding table 200 based on the characteristics of coefficients and then transform the quantization matrix. In the present embodiment, the sequence transformation module 500 uses the Huffman coding method and the run length coding method to transform different types of coefficients in the quantization matrix, but is not limited thereto; in different embodiments, the sequence transformation module 500 can use the arithmetic coding method or entropy coding method to transform the quantization matrix into the digital sequence.

The comparison module 600 compares the data volume of the digital sequence and the target volume 240 and generates a volume difference. The target volume 240 is the desired data volume of the digital sequence, wherein the target volume 240 of the present embodiment is a fixed value. When the data volume of the digital sequence is greater than the target volume 240, the comparison module 600 will control the decoding module 520 of the sequence transformation module 500 to transform the digital sequence from the coding module 510 into an inverse coding matrix based on the coding table 230 of the coding module 510. In the present embodiment, the inverse code matrix and the transformation matrix have the same dimension. However, the inverse code matrix under quantization will contain less data than the transformation matrix.

Furthermore, in the embodiment illustrated in FIG. 5, the target volume 240 is a fixed value. In other words, the data compression system of the present embodiment will compress all original data 210 into the same size, but is not limited thereto; in different embodiments, the target volume 240 can be adjusted. For instance, the memory can have a data compression rate which is a percentage used to define the relationship of the data volume before and after compression. In other words, the memory 200 can obtain the target volume 240 based on the data volume of the original data 210 and the data compression rate. Furthermore, in different embodiments, the memory 200 includes a predetermined difference value to define the acceptable difference in data volume between the digital sequence and the target volume 240. The comparison module 600 will transform the digital sequence into the inverse code matrix when the above-mentioned difference is greater than the predetermined difference value. The predetermined difference value is used as a reference to determine if the digital sequence has been compressed to have an acceptable data volume. In this way, the data compression system 100 is not required to compress the digital sequence to the exact size and thus the number of calculations required is reduced.

In the embodiment illustrated in FIG. 5, the quantization module 400 will perform inverse-quantization on the inverse code matrix to generate an inverse quantization matrix, wherein some of the coefficients of the inverse quantization matrix after quantization (coefficients of higher frequency) will be recovered to the state before quantization. Furthermore, after the quantization module 400 generates the inverse quantization matrix, the comparison module 600 will adjust the quantization table 220 based on the data volume difference to generate a modified quantization table. The quantization module 400 uses the modified quantization table to quantize the inverse quantization matrix and then transforms the inverse quantization matrix into a modified matrix having data volume smaller than or equal to the target volume 240. The sequence transformation module 500 uses the coding table 230 to transform the modified matrix into a modified digital sequence and then sends the modified digital sequence into the comparison module 600 for further processing. If the comparison module 600 finds that the data volume of the modified digital sequence is still greater than the target volume 240, the data compression system 100 will repeat the data compression processes until the data volume of the modified digital sequence is equal to or smaller than the target volume 240 or within an acceptable range of the target volume 240. Once the comparison module 600 has found that the data volume of modified digital sequence is equal to or smaller than the target volume 240, the comparison module 600 will store the modified digital sequence into the memory 200. As FIG. 5 shows, the comparison module 600 of the present embodiment includes a memory control module electrically connected to the memory 200 and is used to store the modified digital sequence into the memory 200.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A data compression method, comprising:
acquiring an original data from a memory;
processing the original data to generate a transformation matrix;
transforming the transformation matrix into a quantization matrix based on a quantization table;
transforming the quantization matrix into a digital sequence based on a coding table;
comparing a data volume of the digital sequence and a target volume to generate a volume difference;
transforming the digital sequence into an inverse quantization matrix based on the volume difference; and
transforming the inverse quantization matrix into a modified digital sequence based on the volume difference;
wherein the step of transforming the digital sequence into an inverse quantization matrix includes:
setting a predetermined difference value;
transforming the digital sequence into an inverse code matrix if the volume difference is greater than the predetermined difference value; and
performing an inverse quantization on the inverse code matrix based on the quantization table;

wherein the step of transforming the quantization matrix into a digital sequence includes:
using different coding methods to transform different portions of the quantization matrix into the digital sequence, and a direct current coefficient of the quantization matrix is coded by a predictive coding method and an entropy coding method or by the predictive coding method and a Huffman coding method or an arithmetic coding method;
wherein the step of transforming the transformation matrix into the quantization matrix includes:
dividing coefficients of the transformation matrix by a constant and then rounding the coefficients off to the nearest integer to adjust the coefficients with high weight to 0 to reduce a data amount of the transformation matrix and save a space of the memory required for storing the transformation matrix, so that the digital sequence and the original data have the same format, but less memory space is required to store the digital sequence than the original data.

2. The data compression method of claim 1, wherein the step of generating the transformation matrix includes:
processing the original data according to a first transformation method to acquire the transformation matrix, wherein the transformation matrix is located in a space domain; and
transforming the transformation matrix from the space domain into a frequency domain according to a second transformation method.

3. The data compression method of claim 1, wherein the step of generating the volume difference includes:
setting a data compression rate;
acquiring the target volume based on a data volume of the original data and the data compression rate; and
comparing the data volume of the digital sequence and the target volume to generate the volume difference.

4. The data compression method of claim 1, wherein the step of transforming the digital sequence into an inverse quantization matrix includes:
transforming the digital sequence into an inverse code matrix based on the coding table if the data volume of the digital sequence is different from the target volume; and
performing an inverse quantization on the inverse code matrix based on the quantization table.

5. The data compression method of claim 1, wherein the step of transforming the inverse quantization matrix into a modified digital sequence includes:
transforming the quantization table into a modified quantization table based on the volume difference;
transforming the inverse quantization matrix into a modified matrix according to the modified quantization table; and
transforming the modified matrix into the modified digital sequence based on the coding table.

6. The data compression method of claim 1, further including storing the modified digital sequence into the memory.

7. A data compression system, comprising:
a memory including original data, a quantization table, a coding table and a target volume;
a signal processing module electrically connected to the memory, for acquiring the original data, wherein the signal processing module generates a transformation matrix based on the original data;
a quantization module electrically connected to the signal processing module, for transforming the transformation matrix into a quantization matrix based on the quantization table; and a sequence transformation module, electrically connected to the quantization module, for transforming the quantization matrix into a digital sequence; and a comparison module comparing a data volume of the digital sequence and the target volume to generate a volume difference;

wherein the quantization module and the sequence transformation module transform the digital sequence into an inverse quantization matrix based on the volume difference, and the comparison module, the quantization module and the sequence transformation module transform the inverse quantization module into a modified digital sequence based on the volume difference, wherein the memory further includes a predetermined difference value, the comparison module controls the sequence transformation module to transform the digital sequence into an inverse code matrix when the volume difference is greater than the predetermined difference value, the quantization module performs an inverse quantization on the inverse code matrix based on the quantization table to obtain the inverse quantization matrix;

wherein when the sequence transformation module transforms the quantization matrix into the digital sequence, the sequence transformation module uses different coding methods to transform different portions of the quantization matrix into the digital sequence, and a direct current coefficient of the quantization matrix is coded by a predictive coding method and an entropy coding method or by the predictive coding method and a Huffman coding method or an arithmetic coding method;

wherein when the quantization module transforms the transformation matrix into the quantization matrix, the quantization module divides coefficients of the transformation matrix by a constant and then rounds the coefficients off to the nearest integer to adjust the coefficients with high weight to 0 to reduce a data amount of the transformation matrix and save a space of the memory required for storing the transformation matrix, so that the digital sequence and the original data have the same format, but less memory space is required to store the digital sequence than the original data.

8. The data compression system of claim 7, wherein the signal processing module includes:

an image processing module for processing the original data according to a first transformation method to obtain the transformation matrix, wherein the transformation matrix is located in a space domain; and a space transformation module for transforming the transformation matrix from the space domain into a frequency domain according to a second transformation method.

9. The data compression system of claim 7, wherein the memory further includes a data compression rate, the comparison module acquires the target volume based on a data volume of the original data and the data compression rate.

10. The data compression system of claim 7, wherein the comparison module transforms the quantization table into a modified quantization table based on the volume difference, the sequence transformation module transforms the modified matrix into the modified digital sequence based on the coding table.

11. The data compression system of claim 7, wherein the comparison module includes a memory control module for accepting the modified digital sequence and storing the modified digital sequence into the memory.

12. A data compression method, comprising:
(a) acquiring original data from a memory;
(b) performing an image processing on the original data to obtain a matrix;
(c) transforming the matrix into a quantization matrix based on a quantization table;
(d) transforming the quantization matrix into a digital sequence based on a coding table and storing the digital sequence in the memory;
(e) comparing a data volume of the digital sequence and a target volume to generate a volume difference and modifying the quantization table based on the volume difference;
(f) transforming the digital sequence into an inverse quantization matrix if the data volume of the digital sequence is substantially different from the target volume;
(g) transforming the inverse quantization matrix into a modified quantization matrix based on the modified quantization table;
(h) abandoning the modified quantization matrix and repeating steps (d), (e), (f), and (g) until the data volume of the digital sequence is substantially equal to the target volume;

wherein the step (f) includes:
setting a predetermined difference value;
transforming the digital sequence into an inverse code matrix if the volume difference is greater than the predetermined difference value; and
performing an inverse quantization on the inverse code matrix based on the quantization table;
wherein the step (d) includes: using different coding methods to transform different portions of the quantization matrix into the digital sequence, and a direct current coefficient of the quantization matrix is coded by a predictive coding method and an entropy coding method or by the predictive coding method and a Huffman coding method or an arithmetic coding method;
wherein the step (c) includes:
dividing coefficients of the matrix by a constant and then rounding the coefficients off to the nearest integer to adjust the coefficients with high weight to 0 to reduce a data amount of the matrix and save a space of the memory required for storing the matrix, so that the digital sequence and the original data have the same format, but less memory space is required to store the digital sequence than the original data.

13. The data compression method of claim 12, wherein the step (b) includes:
processing the original data according to a first transformation method to acquire the matrix, wherein the matrix is located in a space domain; and
transforming the matrix from the space domain to a frequency domain according to a second transformation method.

14. The data compression method of claim 12, wherein the step (e) includes:
setting the target volume;
generating the volume difference between the data volume of the digital sequence and the target volume; and
modifying a plurality of image coefficients of the quantization table based on the volume difference.

15. The data compression method of claim 12, wherein the step (e) includes:
setting a data compression rate;
acquiring the target volume based on a data volume of the original data and the data compression rate; and comparing the data volume of the digital sequence and the target volume to generate the volume difference; and modifying the quantization table based on the volume difference.

* * * * *